United States Patent Office 3,810,879
Patented May 14, 1974

3,810,879
METHOD FOR MAKING AROMATIC HYDROCARBON POLYMERS AND PRODUCTS PRODUCED THEREBY
Allan S. Hay, Schenectady, and Howard M. Relles, Rexford, N.Y., assignors to General Electric Company
No Drawing. Filed Apr. 3, 1972, Ser. No. 240,786
Int. Cl. C08f 5/00, 7/02
U.S. Cl. 260—93.5 R     2 Claims

ABSTRACT OF THE DISCLOSURE

An organometallic condensation polymerization method is provided for making certain aromatic hydrocarbon polymers involving the lithiation of particular aromatic diolefins, such as compounds having two isolated 1-aryl-1,2-dialkylethylene groups in a single molecule, for example, 2,2-bis-(4-phenylcyclohex-3-enyl) propane. The resulting polymers are film forming and can be employed as dielectrics for making capacitors.

The present invention relates to an organometallic condensation polymerization method for making various aromatic hydrocarbon polymers, involving the lithiation of certain aromatic diolefins, and to the polymers made thereby.

There is provided by the present invention, a condensation polymerization method for making aromatic hydrocarbon polymers, which comprises, (A) Effecting reaction under substantially anhydrous and oxygen-free conditions in the presence of an organic solvent, between at least two gram atoms of lithium, per mol of an aromatic diolefin selected from, (1)
$$RCH=C \underset{R^1}{\overset{R^{20}-R^{10}-R^{21}}{\diagdown}} C=CHR^3$$
$$\phantom{RCH=C}R^2$$

(2)
$$R^4CH=C \underset{}{\overset{R^{22}\ R^{23}}{\diagdown}} R^{11} \underset{}{\diagdown} C=CHR^5$$

(3)
$$\underset{R^1}{\overset{R^{24}}{\diagdown}}C=CH-R^{12}-CH=C\underset{R^7}{\overset{R^{25}}{\diagup}}$$

and mixtures thereof, and (B) Recovering an aromatic hydrocarbon polymer from the resulting mixture of (A), where R–R⁷ respectively, are each selected from the same or different lower alkyl radicals, R and R¹, and R² and R³, as respective pairs can be part of a cyclo aliphatic ring structure, $R^{10}$, $R^{11}$ and $R^{12}$ are selected from alkenyl radicals, $R^6$, $R^7$ and $R^{12}$ jointly can constitute a tetravalent organo radical selected from,

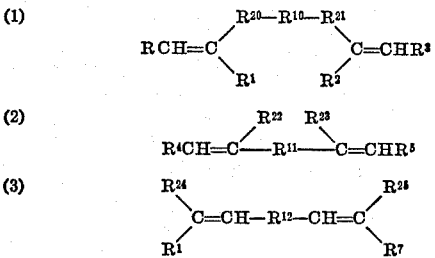

to produce with the other radicals of Formula 3 two interconnected cycloaliphatic radicals, and $R^{20}$–$R^{25}$ are monovalent aromatic hydrocarbon radicals.

Radicals included by R–R⁹ are $C_{(1-8)}$ alkylene radicals, such as methyl, ethyl, propyl, butyl, pentyl, hexyl, heptyl, octyl. In instances where R–R³ constitute respectively part of a cycloaliphatic ring structure, this cycloaliphatic ring structure can be cyclo pentene, cyclohexene, cyclooctene, cycloheptene, etc.; alkylene radicals which are included by $R^{10}$, $R^{11}$ and $R^{12}$ are for example, methylene, dimethylene, trimethylene, tetramethylene, hexamethylene, etc. In instances where $R^6$, $R^7$ and $R^{12}$ can constitute a tetravalent organo radical, this tetravalent organo radical as defined above, can be part of two interconnected cycloalphatic radicals, such as cyclopentane, cyclohexene, cycloheptene, cyclooctene, etc. Radicals included by $R^{13}$, $R^{14}$, $R^{15}$ and $R^{16}$ are alkylene radicals included by $R^{10}$, $R^{11}$ and $R^{12}$ as previously defined. Monovalent aromatic hydrocarbon radicals included by $R^{20}$–$R^{25}$ are radicals, such as phenyl, xylyl, tolyl, naphthyl, anthryl, etc.

Aromatic hydrocarbon polymers which can be made by the above described method, are for example, (4)
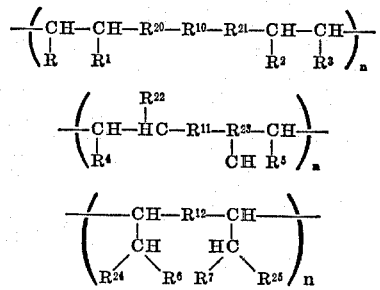

(5)
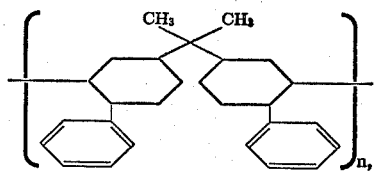

(6)
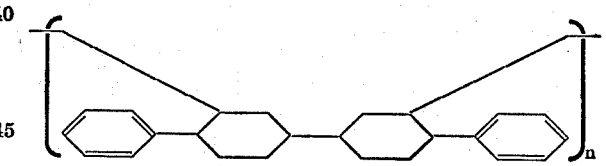

where R–R⁷, $R^{10}$–$R^{12}$, and $R^{20}$–$R^{25}$ are as previously defined, and n is a positive integer having a value up to 200 and preferably 10 to 100.

Included by the aromatic hydrocarbon polymers of Formulas 4–6 are for example,

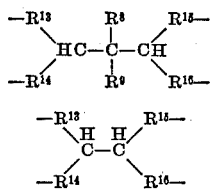

etc.

In the practice of the invention, the aromatic hydrocarbon polymer can be made by stirring a mixture of the aromatic diolefin in an organic solvent in the presence of lithium under substantially anhydrous and oxygen-free conditions. After polymerization has proceeded, as noted for example by the change in color and increase in viscosity of the mixture, the lithium can be replaced in the resulting polymer by the use of a protonating solvent, such as methanol. Recovery of the resulting aromatic hydrocarbon polymer can be achieved by effecting its precipitation from the mixture followed by standard recovery procedures.

Polymerization can be achieved by utilizing 2 gram atoms of lithium metal, per gram mole of aromatic diolefin. The use of an inert atmosphere, such as nitrogen can advantageously maintain the reaction under substantially anhydrous and oxygen-free conditions. During the polymerization the mixture can be agitated, such as by stirring. Depending upon the conditions employed, such as a temperature in the range of from 0° C. to 50° C., and the degree of agitation as well as the aromatic diolefin utilized, reaction time can vary from 2 hours to 48 hours. Recovery of polymer can be effected by pouring the reaction mixture into a precipitating solvent, such as methanol.

The aromatic hydrocarbon polymers made by the method of the present invention can have molecular weight in the range of between 1500 to 25,000. These polymers are film forming and can be advantageously cast from an organic solvent solution, such as chloroform, etc. to produce films exhibiting valuable insulating and dielectric properties. If desired the aforementioned aromatic hydrocarbon polymers can be blended with various reinforcing fillers, such as silica fillers, glass fibers, carbon fibers, etc. in amounts of from 0.1 to 100 parts of filler, per 100 parts of polymer.

In order that those skilled in the art will be better able to practice the invention, the following examples are given by way of illustration and not by way of limitation. All parts are by weight.

EXAMPLE 1

The aromatic diolefins, 2,2-bis-(4-phenylcyclohex-3-enyl)propane was prepared by the following method:

A solution of 39.6 parts of 2,2-bis-(cyclohexan-4-onyl)propane in about 900 parts of tetrahydrofuran was added dropwise over a 4 hour period with stirring at room temperature to a mixture, previously prepared and allowed to react completely, of 100 parts of bromobenzene and 24.3 parts of magnesium turnings in about 900 parts of tetrahydrofuran, while the resulting mixture was maintained under substantially anhydrous and oxygen-free conditions. Towards the end of the addition, the resulting mixture became quite viscous and an additional 500 parts of tetrahydrofuran was added while the mixture was stirred. The stirring of the mixture was then continued for an additional 20 hours at room temperature. There was recovered 70.1 parts of a crude product after the mixture had been treated with 200 parts of a 20% ammonium chloride solution, followed by the removal of excess magnesium salts in extraction with diethyl ether, which was dried with magnesium sulfate and stripped from the extract. The resulting crude glycol was treated with potassium hydrogen sulfate at 180–200° for 30 minutes to dehydrate it to the desired diolefin, 2,2-bis-(4-phenylcyclohex-3-enyl)propane. It was recrystallized from a chloroform/methanol solution and the purified solid had a melting point of 162–166° C.

A mixture of 10 parts of this solid and 1 part of benzoyl peroxide gives an insoluble, crosslinked insulating resin on heating at 100° C. A mixture of 10 parts of the above 2,2-bis-(4-phenylcyclohex-3-enyl)propane and 6 parts of lithium was stirred under substantially anhydrous conditions in 200 parts of tetrahydrofuran. The resulting mixture was maintained at about 25° C. under a nitrogen atmosphere. After the mixture had been stirred for 11 hours, there was added 10 parts of methanol to effect the protonation of all anionic centers and the removal of unreacted lithium. The mixture was then mixed further with about 500 parts of methanol. A crude product precipitated, which was recovered by filtration and reprecipitated from a chloroform solution with methanol. It was dried in a heated vacuum desiccator at 60° C. Based on the method of preparation, spectral data, and gel permeation chromatography there was obtained an aromatic hydrocarbon polymer having the average formula

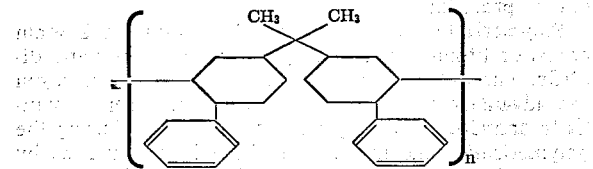

and a weight-average molecular weight of 26,500. The yield of polymer was 90%. It was dissolved in chloroform and a film was cast from the resulting solution onto an aluminum substrate. The resulting composite appeared to exhibit valuable dielectric properties and it was suitable for making a capacitor utilizing the aluminum substrate as one electrode.

EXAMPLE 2

The aromatic diolefin 3',4',5',6',1",2",5",6"-octahydro-p-quaterphenyl was prepared as follows:

There was added 41 parts of 4,4'-dicyclohexanedione in 1 liter of tetrahydrofuran dropwise over a period of 7 hours with mechanical stirring to phenylmagnesium bromide prepared from 100 parts of bromobenzene as described in Example 1. During the addition of the diketone the mixture had to be heated to a temperature between 40 and 50° C. to facilitate stirring. After the addition was complete, the mixture was then stirred and refluxed for additional 17 hours. Then, while the mixture was refluxed, there was slowly added over a period of 1½ hours, 200 ml. or the 1 N hydrogen chloride to effect the hydrolysis of the mixture. There was obtained 73.1 parts of a crude solid after an ether/aqueous HCl workup of the mixture.

The crude product was dehydrated with potassium hydrogen sulfate at 180–200° and then recrystallized from a chloroform/methanol mixture resulting in a 38% yield of a solid having a melting point of 168–171° C. Based on method of preparation, infrared and N.M.R. spectrum and elemental analysis, the product was 3',4',5',6',1",2",5",6"-octahydro-p-quaterphenyl. Heating 10 parts of this material with 1 part of benzoyl peroxide at 100° gave a crosslinked insoluble insulating resin.

The above aromatic diolefin was then stirred with lithium metal and tetrahydrofuran under nitrogen. The reaction mixture contained 10 parts of the aromatic diolefin, 3 parts of lithium metal, and 200 parts of tetrahydrofuran. During reaction the temperature of the mixture was maintained at about 25° C. After 20 hours of stirring there was added 10 parts of methanol to protonate the resulting polymer. Precipitation in methanol afforded a 75% yield of polymer. Based on method of preparation and spectral data, the product was an aromatic hydrocarbon polymer having the average formula,

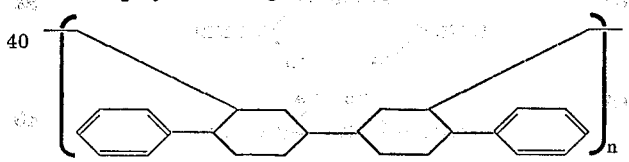

A solution of the above polymer in chloroform was cast onto aluminum foil. The solvent was allowed to evaporate under atmospheric conditions. There was obtained an organic film aluminum composite exhibiting valuable dielectric properties.

EXAMPLE 3

1,2-bis-[4-(2-pentene-3-enyl)phenyl]ethane having the following formula,

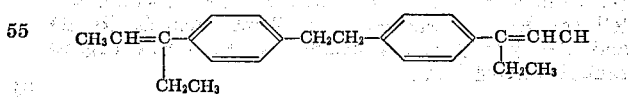

is prepared by the following procedure:

1,2-diphenylethane is stirred with propionyl chloride in the presence of 4 parts of boron trifluoride catalyst utilizing a proportion of 2 moles of propionyl chloride, to 1 mole of 1,2-diphenyl ethane at temperatures of 50° C. There is obtained a yield of 1,2-bis-(4-propionylphenyl)-ethane. The 1,2-bis-(4-propionylphenyl)ethane in tetrahydrofuran is added to ethyl magnesium bromide under substantially anhydrous and oxygen-free conditions utilizing a proportion of 3 moles of the reagent per mole of the 1,2-bis(4-propionylphenyl)ethane. The diol thus obtained is heated at 200° C. in the presence of potassium bisulfate to produce the above described aromatic diolefin.

In accordance with the procedure of Example 1, a mixture of 10 parts of the 1,2-bis[4-(2-pentene-3-yl)phenyl]-ethane is stirred with 6 parts of lithium in tetrahydrofuran under substantially anhydrous and oxygen-free conditions at a temperature of about 25° C. After treatment with methanol, there is recovered a high yield of an aromatic hydrocarbon polymer having the average formula,

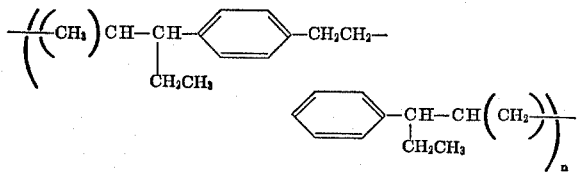

where n has a value of about 10.

The above polymer is cast from a chloroform onto an aluminum substrate to provide an organic polymeric film-aluminum composite exhibiting the valuable dielectric properties.

EXAMPLE 4

4,4-dimethyl-3-5-diphenyl-hepta-2,5-diene having the following formula,

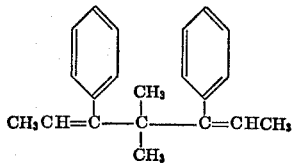

is prepared as follows:

A mixture of 4,4-dimethylheptane-3,5-dione is stirred with phenylmagnesium bromide in tetrahydrofuran solution under substantially anhydrous and oxygen-free conditions at room temperature utilizing a portion of 0.5 moles of the dione per mole of the Grignard. A quantitative yield of the resulting diol is recovered and it is dehydrated with potassium hydrogen sulfate yielding the above aromatic diolefin.

A polymerization mixture containing 10 parts of the above aromatic diolefin and 6 parts of lithium of tetrahydrofuran is stored under nitrogen at a temperature of about 25° C. After the stirring has proceeded for several hours, the mixture is treated with methanol and a high yield of the following aromatic hydrocarbon polymer is obtained:

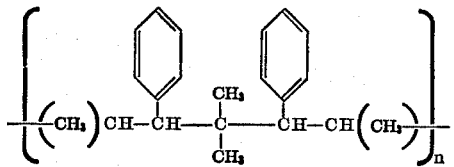

where n is 10.

A solution of the above aromatic hydrocarbon polymer in chloroform is cast onto a glass substrate. The solvent is allowed to evaporate under atmospheric conditions resulting in the production of a polymeric film exhibiting valuable insulating and dielectric characteristics.

Although the above examples are limited to only a few of the very many aromatic hydrocarbon polymers which can be made in the practice of the method of the present invention, it should be understood that the present invention is directed to a much broader class of polymers, as shown by Formulas 4, 5, and 6..

What we claim as new and desire to secure by Letters Patent of the United States is:

1. An aromatic hydrocarbon polymer having the formula

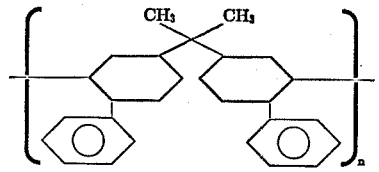

where n has a value of from 10 to 200.

2. A method for making aromatic hydrocarbon polymer which comprises
 (A) effecting reaction at a temperature in the range of from 0 to 50° C., and under substantially anhydrous and oxygen free conditions for about 2 hours to 48 hours in the presence of an organic solvent between at least two gram atoms of lithium per mole of an aromatic diolefin having the formula,

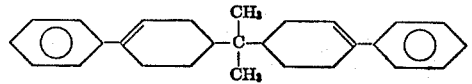

(B) recovering the aromatic hydrocarbon polymer from the resulting mixture of (A).

References Cited

UNITED STATES PATENTS

| | | | |
|---|---|---|---|
| 2,125,401 | 8/1933 | Scott | 260—93.5 |
| 2,572,572 | 10/1951 | Mowry et al. | 260—93.5 |
| 2,622,110 | 12/1952 | Ipatieff | 260—668 |
| 3,463,828 | 8/1969 | Crain | 260—666 |

JAMES A. SEIDLECK, Primary Examiner

U.C. Cl. X.R.

260—2 H, 668 R